US008677088B1

(12) United States Patent
Patil (10) Patent No.: US 8,677,088 B1
(45) Date of Patent: Mar. 18, 2014

(54) SYSTEMS AND METHODS FOR RECOVERING PRIMARY SITES AFTER FAILOVERS TO REMOTE SECONDARY SITES

(75) Inventor: Roshni Jaywantsingh Patil, Maharashtra (IN)

(73) Assignee: Symantec Corporation, Mountain View, CA (US)

( * ) Notice: Subject to any disclaimer, the term of this patent is extended or adjusted under 35 U.S.C. 154(b) by 535 days.

(21) Appl. No.: 12/608,127

(22) Filed: Oct. 29, 2009

(51) Int. Cl.
*G06F 13/00* (2006.01)
*G06F 13/28* (2006.01)
*G06F 12/00* (2006.01)
*G06F 11/00* (2006.01)
*G06F 11/16* (2006.01)

(52) U.S. Cl.
USPC .......................................... 711/162; 714/6.3

(58) Field of Classification Search
USPC ........... 711/162, 161; 714/4.11, 4.2, 6.13, 6.3
See application file for complete search history.

(56) References Cited

U.S. PATENT DOCUMENTS

| 5,408,656 | A  | * | 4/1995  | Cohn et al. ............................ | 1/1     |
|-----------|----|---|---------|-------------------------------------------|---------|
| 5,623,669 | A  | * | 4/1997  | Kincaid .................................. | 1/1     |
| 6,694,447 | B1 | * | 2/2004  | Leach et al. ..................... | 714/6.3 |
| 7,103,796 | B1 | * | 9/2006  | Kekre et al. ..................... | 714/6.31 |
| 7,188,272 | B2 | * | 3/2007  | Bartfai et al. ................. | 714/6.31 |
| 7,765,370 | B2 | * | 7/2010  | Iwamura et al. .............. | 711/161 |
| 2002/0165724 | A1 | * | 11/2002 | Blankesteijn ..................... | 705/1 |
| 2007/0094467 | A1 | * | 4/2007  | Yamasaki ..................... | 711/162 |
| 2008/0172572 | A1 | * | 7/2008  | Beardsley et al. ................ | 714/6 |

OTHER PUBLICATIONS

Veritas Volume Replicator Option by Symantec: A Guide to Understanding Volume Replicator, Sep. 2006, p. 13.*

* cited by examiner

*Primary Examiner* — Matthew Bradley
*Assistant Examiner* — Rocio Del Mar Perez-Velez
(74) *Attorney, Agent, or Firm* — ALG Intellectual Property, LLC (57) ABSTRACT

A computer-implemented method for recovering primary sites after failovers to remote secondary sites may include: 1) identifying a primary system configured to replicate data to both a local bunker system and a remote secondary system, 2) failing the primary system over to the remote secondary system, 3) replicating, to the local bunker system, data changes made on the remote secondary system, and then 4) updating the primary system with the data changes stored on the local bunker system. Various other methods, systems, and computer-readable media are also disclosed.

19 Claims, 8 Drawing Sheets

SYSTEMS AND METHODS FOR RECOVERING PRIMARY SITES AFTER FAILOVERS TO REMOTE SECONDARY SITES

BACKGROUND

Organizations increasingly depend on critical applications and data in the course of business. For this reason, organizations typically attempt to both minimize the downtime of critical applications and control the risk of losing sensitive data managed by such applications.

For example, an organization may attempt to preserve sensitive data and reduce application downtime by replicating (i.e., continuously maintaining a copy of) application data from a primary site to a remote secondary site. If and when the primary site experiences disruption, the primary site may fail over to the remote secondary site (i.e., the secondary site may take on the role of the primary site) until the primary site is ready to resume operations.

In order to resume control of applications temporarily managed by the remote secondary site, the primary site may require an up-to-date copy of the application data managed by the remote secondary site. Unfortunately, due at least in part to the remote location of the remote secondary site, updating the primary site with the updated version of the application data from the remote secondary site may take a relatively long time, potentially unnecessarily delaying the full recovery of the primary site. Accordingly, the instant disclosure identifies and addresses a need for systems and methods for efficiently updating primary sites after failovers to remote secondary sites.

SUMMARY

As will be described in greater detail below, the instant disclosure generally relates to systems and methods for efficiently recovering primary sites after failovers to remote secondary sites in order to reduce the time necessary to fully recover the primary sites. In one example, the various systems described herein may accomplish this task by: 1) identifying a primary system configured to replicate data to both a local bunker system and a remote secondary system, 2) failing the primary system over to the remote secondary system, 3) replicating data changes made on the remote secondary system to the local bunker system, and then 4) updating the primary system with the data changes stored on the local bunker system.

In some examples, replicating the data changes made on the remote secondary system may include asynchronously replicating the data changes made on the remote secondary system to the local bunker system. In addition, replicating the data changes to the local bunker system may include storing the data changes in a storage replication log on the local bunker system.

In one example, replicating the data changes to the local bunker system may include storing changed regions of data on the local bunker system. In this example, storing the changed regions of data on the local bunker system may include storing the most recent version of data for each region.

In some embodiments, replicating the data changes to the local bunker system may include allocating space on the local bunker system for the data changes. Replicating the data changes to the local bunker system may also include replicating the data changes to the local bunker system until the primary system is ready to receive the data changes.

In one example, updating the primary system with the data changes stored on the local bunker system may include: 1) restoring the primary system from a snapshot and then 2) resyncing the primary system with the data changes stored on the local bunker system. In other examples, updating the primary system with the data changes stored on the local bunker system may include: 1) resyncing the primary system with the data changes stored on the local bunker system, 2) terminating replication from the remote secondary system to the local bunker system, and then 3) syncing the primary system with data changes made on the remote secondary system that were not replicated to the local bunker system.

In some examples, updating the primary system with the data changes stored on the local bunker system may include: 1) initiating copying of the data changes from the local bunker system to the primary system, 2) receiving a request to read data on the primary system from a changed region that has not yet been updated, 3) retrieving the changed region from the local bunker system, and then 4) fulfilling the request to read data.

In an additional embodiment, the various systems described herein may also: 1) identify a snapshot of data from the primary system and 2) pre-fetch, from the remote secondary system to the local bunker system, data that changed after the snapshot but before failing the primary system over to the remote secondary system. In this example, pre-fetching the data that changed after the snapshot but before failing the primary system over to the remote secondary system may include: 1) identifying a data change object from the primary system on the local bunker system and then 2) identifying, based on the data change object, data that changed after the snapshot but before failing the primary system over to the remote secondary system. Pre-fetching the data that changed after the snapshot but before failing the primary system over to the remote secondary system may also include: 1) saving, in a storage replication log on the local bunker system, data that changed after the snapshot and then 2) pre-fetching, from the remote secondary system to the local bunker system, data that is not in the storage replication log that changed after the snapshot but before failing the primary system over to the remote secondary system.

As will be explained below, by keeping a local bunker system up-to-date with changes made to application data on a remote secondary system, the systems and methods described herein may restore a primary system using data on the local bunker system, as opposed to having to restore the primary site solely from the remote secondary system. As such, these systems and methods may avoid the delays that typically result from having to restore a primary site directly from a remote secondary system, potentially resulting in a faster and more efficient recovery of the primary system.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for recovering primary sites after failovers to remote secondary sites. In one example, the various systems described herein may accomplish this task by: 1) identifying a primary system configured to replicate data to both a local bunker system and a remote secondary system, 2) failing the primary system over to the remote secondary system, 3) replicating data changes made on the remote secondary system to the local bunker system, and then 4) updating the primary system with the data changes stored on the local bunker system.

As will be explained below, by keeping a local bunker system up-to-date with changes made to application data on a remote secondary system, the systems and methods described herein may restore a primary system using data on the local bunker system, as opposed to having to restore the primary site solely from the remote secondary system. As such, these systems and methods may avoid the delays that typically result from having to restore a primary site directly from a remote secondary system, potentially resulting in a faster and more efficient recovery of the primary system.

Figure 1:
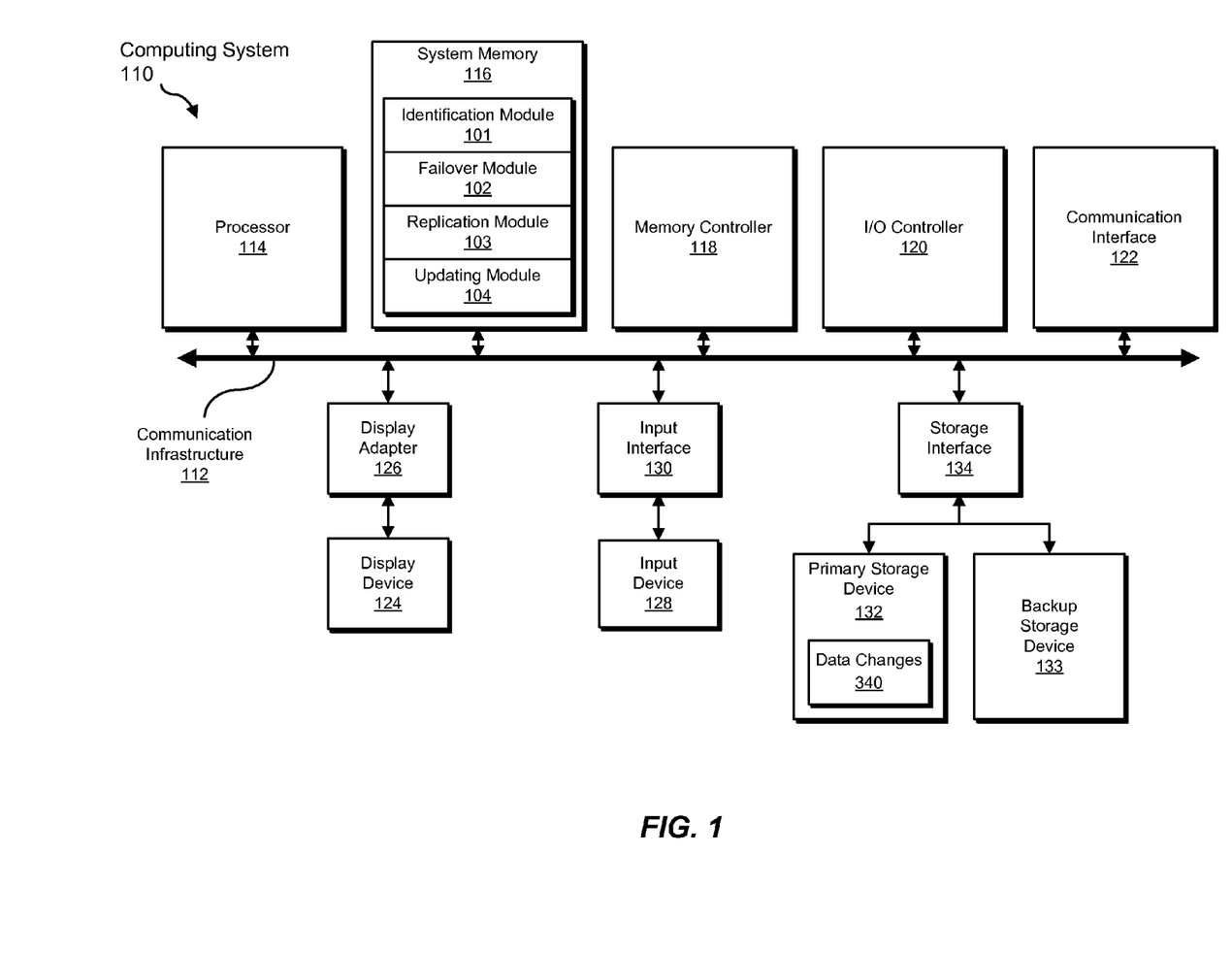
FIG. 1 is a block diagram of an exemplary computing system capable of implementing one or more of the embodiments described and/or illustrated herein.
Figure 2:
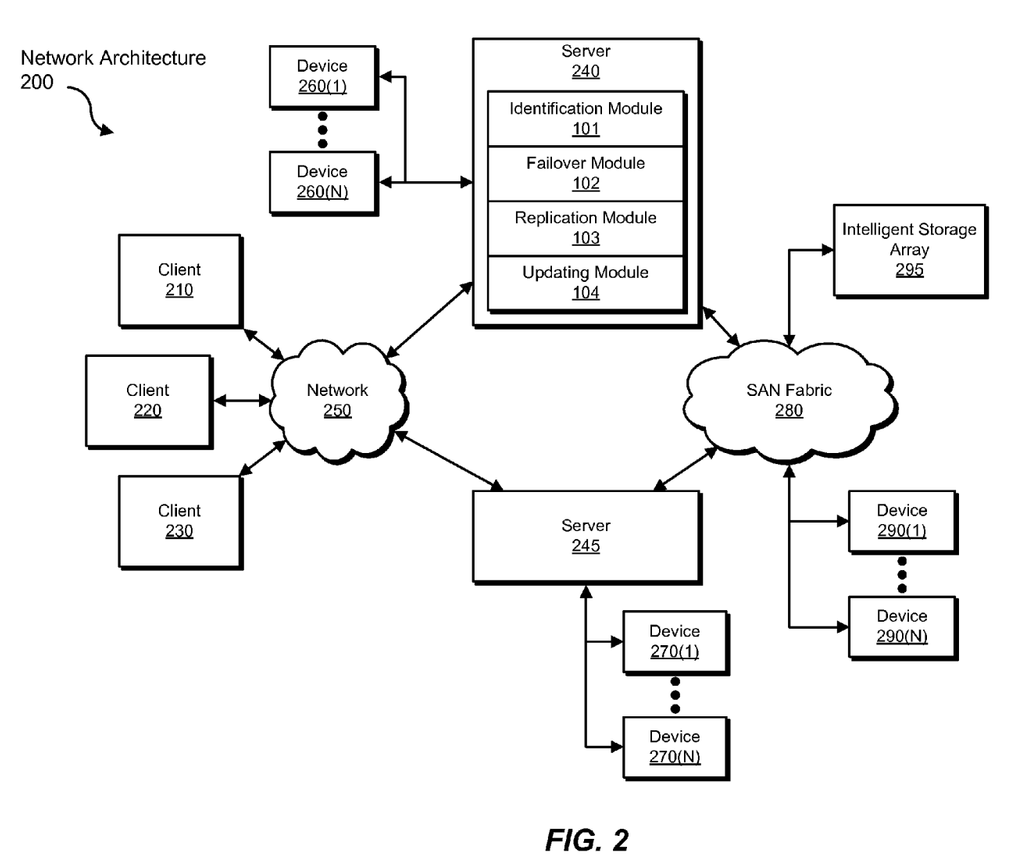
FIG. 2 is a block diagram of an exemplary computing network capable of implementing one or more of the embodiments described and/or illustrated herein.

The following will provide, with reference to FIGS. 1 and 2, detailed descriptions of an exemplary computing system and network architecture capable of implementing one or more of the embodiments described herein. In addition, detailed descriptions of exemplary systems for recovering primary sites after failovers to remote secondary sites will be provided with reference to FIGS. 3, 4, 7 and 8. Detailed descriptions of corresponding computer-implemented methods will also be provided in connection with FIGS. 5-6.

FIG. 1 is a block diagram of an exemplary computing system 110 capable of implementing one or more of the embodiments described and/or illustrated herein. Computing system 110 broadly represents any single or multi-processor computing device or system capable of executing computer-readable instructions. Examples of computing system 110 include, without limitation, workstations, laptops, client-side terminals, servers, distributed computing systems, handheld devices, or any other computing system or device. In its most basic configuration, computing system 110 may include at least one processor 114 and a system memory 116.

Processor 114 generally represents any type or form of processing unit capable of processing data or interpreting and executing instructions. In certain embodiments, processor 114 may receive instructions from a software application or module. These instructions may cause processor 114 to perform the functions of one or more of the exemplary embodiments described and/or illustrated herein. For example, processor 114 may perform and/or be a means for performing, either alone or in combination with other elements, one or more of the recovering, identifying, failing, replicating, updating, storing, allocating pre-fetching, sending, saving, restoring, terminating, syncing, initiating, receiving, retrieving, fulfilling, and/or resyncing steps described herein. Processor 114 may also perform and/or be a means for performing any other steps, methods, or processes described and/or illustrated herein.

System memory 116 generally represents any type or form of volatile or non-volatile storage device or medium capable of storing data and/or other computer-readable instructions. Examples of system memory 116 include, without limitation, random access memory (RAM), read only memory (ROM), flash memory, or any other suitable memory device. Although not required, in certain embodiments computing system 110 may include both a volatile memory unit (such as, for example, system memory 116) and a non-volatile storage device (such as, for example, primary storage device 132, as described in detail below). In one example, one or more of modules 310 from FIG. 3 (e.g., identification module 101, failover module 102, replication module 103, and updating module 104) may be loaded into system memory 116.

In certain embodiments, exemplary computing system 110 may also include one or more components or elements in addition to processor 114 and system memory 116. For example, as illustrated in FIG. 1, computing system 110 may include a memory controller 118, an Input/Output (I/O) controller 120, and a communication interface 122, each of which may be interconnected via a communication infrastructure 112. Communication infrastructure 112 generally represents any type or form of infrastructure capable of facilitating communication between one or more components of a computing device. Examples of communication infrastructure 112 include, without limitation, a communication bus (such as an ISA, PCI, PCIe, or similar bus) and a network.

Memory controller 118 generally represents any type or form of device capable of handling memory or data or controlling communication between one or more components of computing system 110. For example, in certain embodiments memory controller 118 may control communication between processor 114, system memory 116, and I/O controller 120 via communication infrastructure 112. In certain embodiments, memory controller 118 may perform and/or be a means for performing, either alone or in combination with other elements, one or more of the steps or features described and/or illustrated herein, such as recovering, identifying, failing, replicating, updating, storing, allocating pre-fetching, sending, saving, restoring, terminating, syncing, initiating, receiving, retrieving, fulfilling, and/or resyncing.

I/O controller 120 generally represents any type or form of module capable of coordinating and/or controlling the input and output functions of a computing device. For example, in certain embodiments I/O controller 120 may control or facilitate transfer of data between one or more elements of computing system 110, such as processor 114, system memory 116, communication interface 122, display adapter 126, input interface 130, and storage interface 134. I/O controller 120 may be used, for example, to perform and/or be a means for performing, either alone or in combination with other elements, one or more of the recovering, identifying, failing, replicating, updating, storing, allocating pre-fetching, sending, saving, restoring, terminating, syncing, initiating, receiving, retrieving, fulfilling, and/or resyncing steps described herein. I/O controller 120 may also be used to perform and/or be a means for performing other steps and features set forth in the instant disclosure.

Communication interface 122 broadly represents any type or form of communication device or adapter capable of facilitating communication between exemplary computing system 110 and one or more additional devices. For example, in certain embodiments communication interface 122 may facilitate communication between computing system 110 and a private or public network including additional computing systems. Examples of communication interface 122 include, without limitation, a wired network interface (such as a network interface card), a wireless network interface (such as a wireless network interface card), a modem, and any other suitable interface. In at least one embodiment, communication interface 122 may provide a direct connection to a remote server via a direct link to a network, such as the Internet. Communication interface 122 may also indirectly provide such a connection through, for example, a local area network (such as an Ethernet network), a personal area network, a telephone or cable network, a cellular telephone connection, a satellite data connection, or any other suitable connection.

In certain embodiments, communication interface 122 may also represent a host adapter configured to facilitate communication between computing system 110 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 122 may also allow computing system 110 to engage in distributed or remote computing. For example, communication interface 122 may receive instructions from a remote device or send instructions to a remote device for execution. In certain embodiments, communication interface 122 may perform and/or be a means for performing, either alone or in combination with other elements, one or more of the recovering, identifying, failing, replicating, updating, storing, allocating pre-fetching, sending, saving, restoring, terminating, syncing, initiating, receiving, retrieving, fulfilling, and/or resyncing steps disclosed herein. Communication interface 122 may also be used to perform and/or be a means for performing other steps and features set forth in the instant disclosure.

As illustrated in FIG. 1, computing system 110 may also include at least one display device 124 coupled to communication infrastructure 112 via a display adapter 126. Display device 124 generally represents any type or form of device capable of visually displaying information forwarded by display adapter 126. Similarly, display adapter 126 generally represents any type or form of device configured to forward graphics, text, and other data from communication infrastructure 112 (or from a frame buffer, as known in the art) for display on display device 124.

As illustrated in FIG. 1, exemplary computing system 110 may also include at least one input device 128 coupled to communication infrastructure 112 via an input interface 130. Input device 128 generally represents any type or form of input device capable of providing input, either computer or human generated, to exemplary computing system 110. Examples of input device 128 include, without limitation, a keyboard, a pointing device, a speech recognition device, or any other input device. In at least one embodiment, input device 128 may perform and/or be a means for performing, either alone or in combination with other elements, one or more of the recovering, identifying, failing, replicating, updating, storing, allocating pre-fetching, sending, saving, restoring, terminating, syncing, initiating, receiving, retrieving, fulfilling, and/or resyncing steps disclosed herein. Input device 128 may also be used to perform and/or be a means for performing other steps and features set forth in the instant disclosure.

As illustrated in FIG. 1, exemplary computing system 110 may also include a primary storage device 132 and a backup storage device 133 coupled to communication infrastructure 112 via a storage interface 134. Storage devices 132 and 133 generally represent any type or form of storage device or medium capable of storing data and/or other computer-readable instructions. For example, storage devices 132 and 133 may be a magnetic disk drive (e.g., a so-called hard drive), a floppy disk drive, a magnetic tape drive, an optical disk drive, a flash drive, or the like. Storage interface 134 generally represents any type or form of interface or device for transferring data between storage devices 132 and 133 and other components of computing system 110.

In certain embodiments, storage devices 132 and 133 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 132 and 133 may also include other similar structures or devices for allowing computer software, data, or other computer-readable instructions to be loaded into computing system 110. For example, storage devices 132 and 133 may be configured to read and write software, data, or other computer-readable information. Storage devices 132 and 133 may also be a part of computing system 110 or may be a separate device accessed through other interface systems. In one example, primary storage device 132 may include data changes 340 from FIG. 3, as discussed in greater detail below.

In certain embodiments, storage devices 132 and 133 may be used, for example, to perform and/or be a means for performing, either alone or in combination with other elements, one or more of the recovering, identifying, failing, replicating, updating, storing, allocating pre-fetching, sending, saving, restoring, terminating, syncing, initiating, receiving, retrieving, fulfilling, and/or resyncing steps disclosed herein. Storage devices 132 and 133 may also be used to perform and/or be a means for performing other steps and features set forth in the instant disclosure.

Many other devices or subsystems may be connected to computing system 110. Conversely, all of the components and devices illustrated in FIG. 1 need not be present to practice the embodiments described and/or illustrated herein. The devices and subsystems referenced above may also be interconnected in different ways from that shown in FIG. 1. Computing system 110 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 110. All or a portion of the computer program stored on the computer-readable medium may then be stored in system memory 116 and/or various portions of storage devices 132 and 133. When executed by processor 114, a computer program loaded into computing system 110 may cause processor 114 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 110 may be configured as an application specific integrated circuit (ASIC) adapted to implement one or more of the exemplary embodiments disclosed herein.

FIG. 2 is a block diagram of an exemplary network architecture 200 in which client systems 210, 220, and 230 and servers 240 and 245 may be coupled to a network 250. Client systems 210, 220, and 230 generally represent any type or form of computing device or system, such as exemplary computing system 110 in FIG. 1.

Similarly, servers 240 and 245 generally represent computing devices or systems, such as application servers or database servers, configured to provide various database services and/or run certain software applications. In one example, server 240 may include system 300 from FIG. 3 (e.g., identification module 101, failover module 102, replication module 103, and/or updating module 104). Network 250 generally represents any telecommunication or computer network including, for example, an intranet, a wide area network (WAN), a local area network (LAN), a personal area network (PAN), or the Internet.

As illustrated in FIG. 2, one or more storage devices 260(1)-(N) may be directly attached to server 240. Similarly, one or more storage devices 270(1)-(N) may be directly attached to server 245. Storage devices 260(1)-(N) and storage devices 270(1)-(N) generally represent any type or form of storage device or medium capable of storing data and/or other computer-readable instructions. In certain embodiments, storage devices 260(1)-(N) and storage devices 270(1)-(N) may represent network-attached storage (NAS) devices configured to communicate with servers 240 and 245 using various protocols, such as NFS, SMB, or CIFS.

Servers 240 and 245 may also be connected to a storage area network (SAN) fabric 280. SAN fabric 280 generally represents any type or form of computer network or architecture capable of facilitating communication between a plurality of storage devices. SAN fabric 280 may facilitate communication between servers 240 and 245 and a plurality of storage devices 290(1)-(N) and/or an intelligent storage array 295. SAN fabric 280 may also facilitate, via network 250 and servers 240 and 245, communication between client systems 210, 220, and 230 and storage devices 290(1)-(N) and/or intelligent storage array 295 in such a manner that devices 290(1)-(N) and array 295 appear as locally attached devices to client systems 210, 220, and 230. As with storage devices 260(1)-(N) and storage devices 270(1)-(N), storage devices 290(1)-(N) and intelligent storage array 295 generally represent any type or form of storage device or medium capable of storing data and/or other computer-readable instructions.

In certain embodiments, and with reference to exemplary computing system 110 of FIG. 1, a communication interface, such as communication interface 122 in FIG. 1, may be used to provide connectivity between each client system 210, 220, and 230 and network 250. Client systems 210, 220, and 230 may be able to access information on server 240 or 245 using, for example, a web browser or other client software. Such software may allow client systems 210, 220, and 230 to access data hosted by server 240, server 245, storage devices 260(1)-(N), storage devices 270(1)-(N), storage devices 290(1)-(N), or intelligent storage array 295. Although FIG. 2 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 240, server 245, storage devices 260(1)-(N), storage devices 270(1)-(N), storage devices 290(1)-(N), intelligent storage array 295, or any combination thereof. All or a portion of one or more of the exemplary embodiments disclosed herein may also be encoded as a computer program, stored in server 240, run by server 245, and distributed to client systems 210, 220, and 230 over network 250. Accordingly, network architecture 200 may perform and/or be a means for performing, either alone or in combination with other elements, one or more of the recovering, identifying, failing, replicating, updating, storing, allocating pre-fetching, sending, saving, restoring, terminating, syncing, initiating, receiving, retrieving, fulfilling, and/or resyncing steps disclosed herein. Network architecture 200 may also be used to perform and/or be a means for performing other steps and features set forth in the instant disclosure.

As detailed above, computing system 110 and/or one or more components of network architecture 200 may perform and/or be a means for performing, either alone or in combination with other elements, one or more steps of an exemplary method for recovering primary sites after failovers to remote secondary sites.

Figure 3:
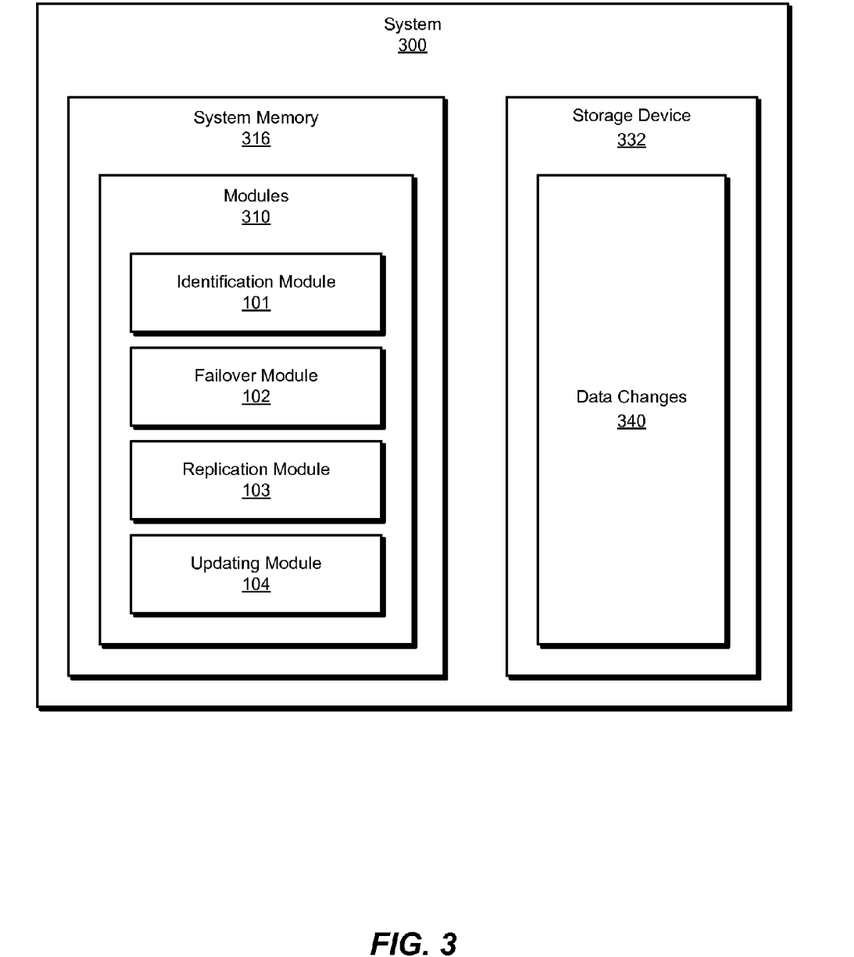
FIG. 3 is a block diagram of an exemplary system for recovering primary sites after failovers to remote secondary sites.

FIG. 3 is a block diagram of an exemplary system 300 for recovering primary sites after failovers to remote secondary sites. As illustrated in this figure, exemplary system 300 may include system memory 316 containing one or more modules 310 for performing one or more tasks. For example, and as will be explained in greater detail below, exemplary system 300 may include an identification module 101 programmed to identify a primary system configured to replicate data to both a local bunker system and a remote secondary system. Exemplary system 300 may also include a failover module 102 programmed to fail the primary system over to the remote secondary system.

In addition, and as will be described in greater detail below, exemplary system 300 may include a replication module 103 programmed to replicate data changes made on the remote secondary system to the local bunker system. Exemplary system 300 may also include an updating module 104 programmed to update the primary system with the changed data stored on the local bunker system. Although illustrated as separate elements, one or more of modules 310 in FIG. 3 may represent portions of a single module or application.

In certain embodiments, one or more of modules 310 in FIG. 3 may represent one or more software applications or programs that, when executed by a computing device, may cause the computing device to perform one or more tasks. For example, as will be described in greater detail below, one or more of modules 310 may represent software modules stored and configured to run on one or more computing devices, such as the devices illustrated in FIG. 4 (e.g., primary system 404, local bunker system 414, and/or remote secondary system 424), computing system 110 in FIG. 1, and/or portions of exemplary network architecture 200 in FIG. 2. One or more of modules 310 in FIG. 3 may also represent all or portions of one or more special-purpose computers configured to perform one or more tasks.

As illustrated in FIG. 3, exemplary system 300 may also include a storage device 332 containing data changes 340. As will be described in greater detail below, data changes 340 may generally represent any data useful for updating a primary system after a failover. For example, data changes 340 may include new or changed data produced by applications after failing over to a remote secondary system. Additionally or alternatively, data changes 340 may include data changes made to application data on a primary system after a snapshot of the primary system was taken.

Figure 4:
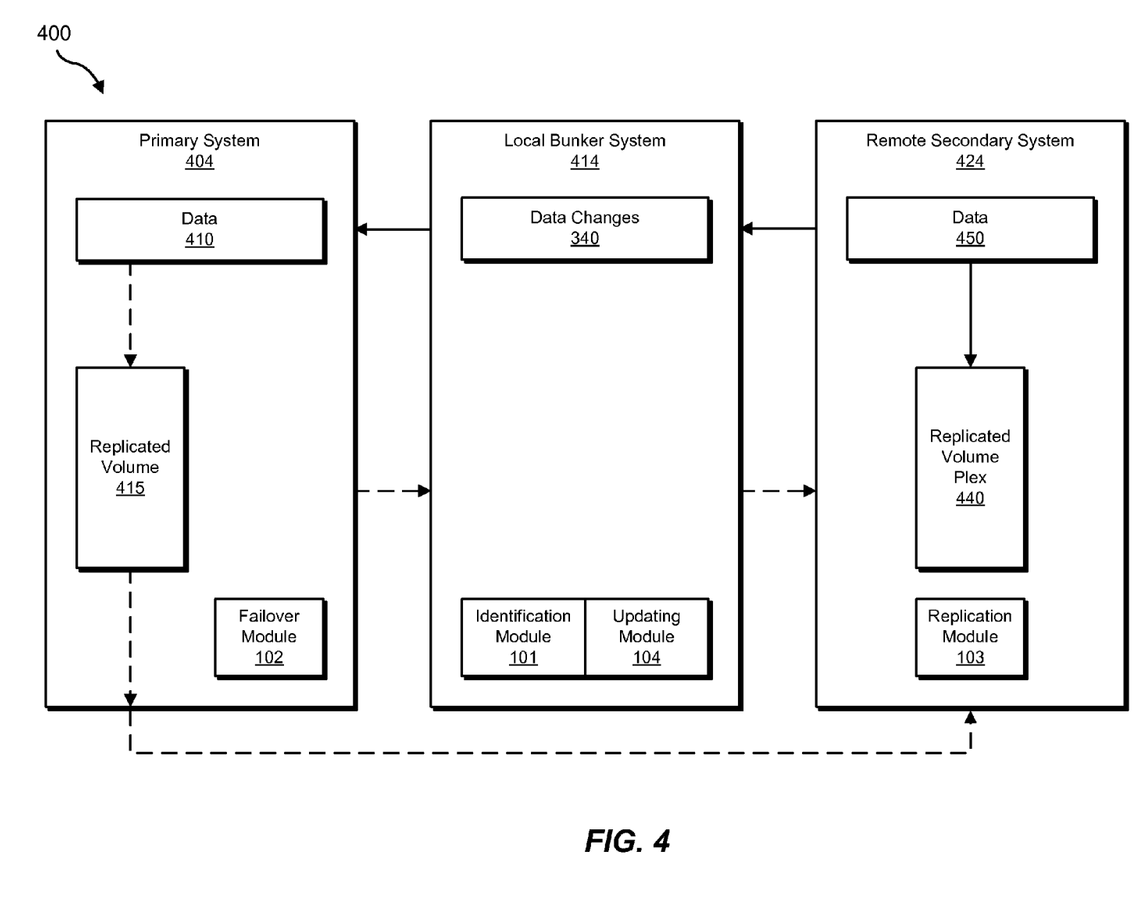
FIG. 4 is a block diagram of an exemplary system for recovering primary sites after failovers to remote secondary sites.

Exemplary system 300 in FIG. 3 may be deployed in a variety of ways. For example, exemplary system 300 may represent a portion of an exemplary system 400 in FIG. 4. As shown in FIG. 4, system 400 may include a primary system 404 in communication with a local bunker system 414 and a remote secondary system 424. In one embodiment, and as will be described in greater detail below, remote secondary system 424 may be programmed to replicate post-failover data changes to local bunker system 414, which may in turn be programmed to update primary system 404 with the data changes.

For example, local bunker system 414 may be programmed with identification module 101 from FIG. 1. In this example, and as will be described in greater detail below, identification module 101 may identify a primary system (such as primary system 404) configured to replicate data (such as a replicated volume 415 that has been replicated from data 410 on primary system 404) to both a local bunker system (such as local bunker system 414) and a remote secondary system (such as remote secondary system 424). In addition, primary system 404 may be programmed with a failover module 102. In this example, failover module 102 may fail primary system 404 over to remote secondary system 424 (e.g., due to failure of primary system 404 or in order to perform required maintenance on primary system 404).

Remote secondary system 424 may then run applications on behalf of primary system 404, using the replicated data from primary system 404 (e.g., replicated volume plex 440). In the course of running these applications, remote secondary system 424 may receive and/or create new data, such as data 450, which data 450 may in turn modify replicated volume plex 440. Replication module 103 may then replicate, as part of remote secondary system 424, data changes made on remote secondary system (e.g., changes made to replicated volume plex 440 occasioned by data 450) to local bunker system 414, which may in turn result in data changes 340 on local bunker system 414. Once the failover is no longer necessary, as a part of returning control of the applications from remote secondary system 424 to primary system 404, updating module 104 on local bunker system 414 may update primary system 404 with the data changes stored on local bunker system 414 (e.g., data changes 340).

Primary system 404 generally represents any type or form of computing device capable of reading computer-executable instructions. In some embodiments, primary system 404 may include a computing system configured to run certain applications and/or to synchronously replicate a data volume to local bunker system 414. Examples of primary system 404 include, without limitation, laptops, desktops, servers, cellular phones, personal digital assistants (PDAs), multimedia players, embedded systems, combinations of one or more of the same, exemplary computing system 110 in FIG. 1, or any other suitable computing device.

Local bunker system 414 generally represents any type or form of computing device capable of reading computer-executable instructions. In some embodiments, local bunker system 414 may include a computing system configured to asynchronously replicate a data volume to remote secondary system 424. In at least one example, local bunker system 414 may include a computing system in close proximity to primary system 404 and/or a computing system connected to the same storage area network as primary system 404. Examples of local bunker system 414 include, without limitation, laptops, desktops, servers, cellular phones, personal digital assistants (PDAs), multimedia players, embedded systems, combinations of one or more of the same, exemplary computing system 110 in FIG. 1, or any other suitable computing device.

Remote secondary system 424 generally represents any type or form of computing device capable of reading computer-executable instructions. In some embodiments, remote secondary system 424 may include a computing system configured to run certain applications. Examples of remote secondary system 424 include, without limitation, laptops, desktops, servers, cellular phones, personal digital assistants (PDAs), multimedia players, embedded systems, combinations of one or more of the same, exemplary computing system 110 in FIG. 1, or any other suitable computing device.

Figure 5:
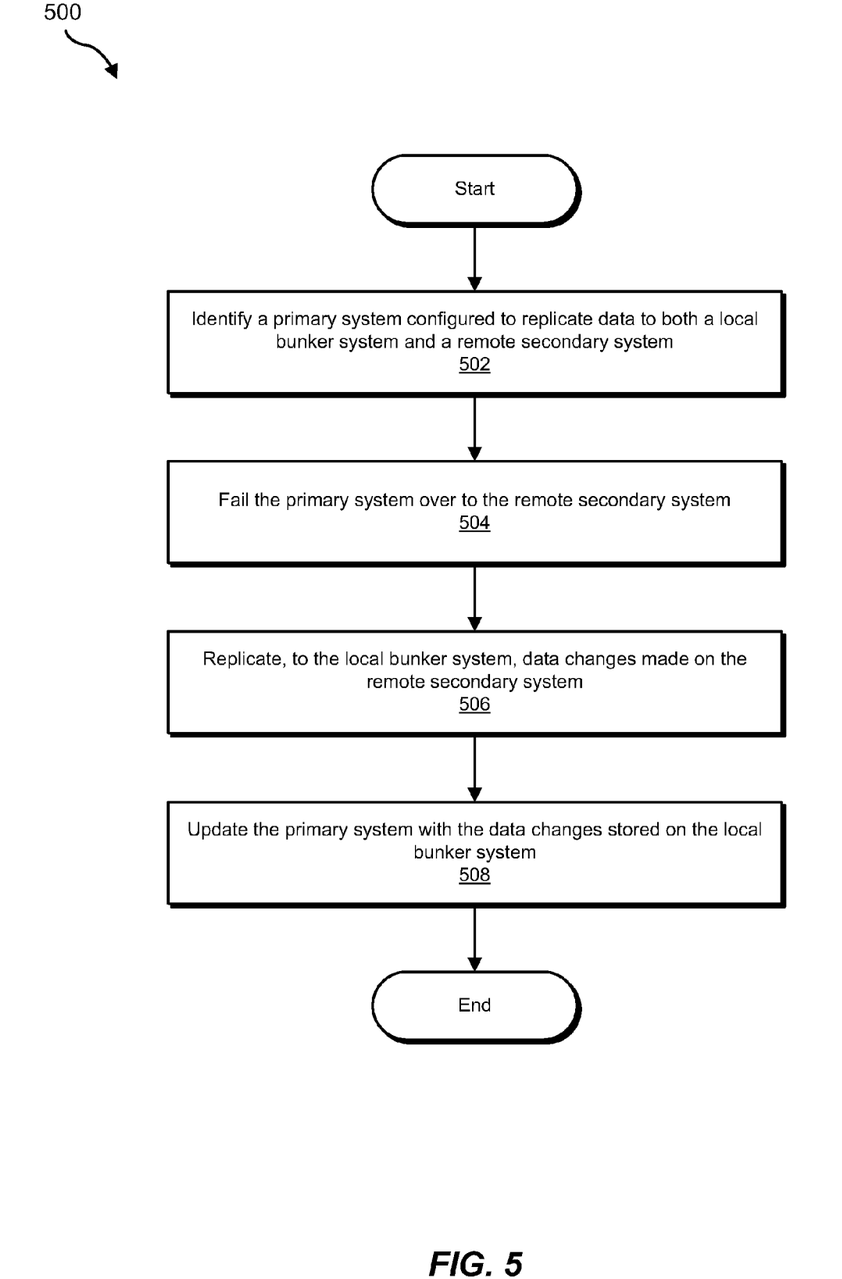
FIG. 5 is a flow diagram of an exemplary method for recovering primary sites after failovers to remote secondary sites.

FIG. 5 is a flow diagram of an exemplary computer-implemented method 500 for recovering primary sites after failovers to remote secondary sites. The steps shown in FIG. 5 may be performed by any suitable computer-executable code and/or computing system. In some embodiments, the steps shown in FIG. 5 may be performed by one or more of the components of system 300 in FIG. 3 and/or system 400 in FIG. 4.

As illustrated in FIG. 5, at step 502 one or more of the systems described herein may identify a primary system configured to replicate data to both a local bunker system and a remote secondary system. For example, identification module 101 may, as part of local bunker system 414 in FIG. 4, identify primary system 404 configured to replicate replicated volume 415 to both local bunker system 414 and remote secondary system 424.

As used herein, the term "replicate" may refer to any process for copying, replicating, mirroring, and/or backing up data. Similarly, "replication" may involve creating a complete copy of the replicated data, a copy of relevant portions of the replicated data, and/or a collection of data sufficient to reconstruct the replicated data. In addition, "replicated data" may refer to a replicated data volume, replicated files, a plex, and/or a collection of data used in the course of replicating data (e.g., a storage replication log).

Identification module 101 may identify the primary system in step 502 in any suitable manner. For example, identification module 101 may identify the primary system by obtaining information that identifies the primary system from a configuration file. Additionally or alternatively, identification module 101 may identify the primary system by receiving a message and/or replicated data directly from the primary system.

Returning to FIG. 5, at step 504 one or more of the systems described herein may fail the primary system over to the remote secondary system. For example, failover module 102 may, as part of primary system 404 in FIG. 4, fail primary system 404 over to remote secondary system 424.

As used herein, the phrase "failing over" may refer to any operation in which one computing system temporarily performs the tasks of another computing system. For example, if a primary system fails over to a remote secondary system, applications that were running on and/or communicating with the primary system may begin to run on and/or communicate with the remote secondary system instead.

Failover module 102 may fail the primary system over to the remote secondary system in step 504 in any suitable manner. For example, failover module 102 may send a message to the remote secondary system to commence operations in place of the primary system. Additionally or alternatively, failover module 102 may reconfigure a network, cloud, or other connectivity system to direct traffic to the remote secondary system. In some embodiments, failover module 102 may halt applications on the primary system and/or restrict access to data on the primary system.

Returning to FIG. 5, at step 506 one or more of the systems described herein may replicate, to the local bunker system, data changes made on the remote secondary system. For example, replication module 103 may, as part of remote secondary system 424 in FIG. 4, replicate changes made to replicated volume plex 440 by data 450 to local bunker system 414.

Replication module 103 may replicate the data changes made on the remote secondary system in step 506 in a variety of ways. In one example, replication module 103 may asynchronously replicate data changes made on the remote secondary system to the local bunker system (by, e.g., replicating data changes made on the remote secondary system to the local bunker system when I/O operations will be minimally impacted). In this example, replication module 103 may improve I/O response time on the remote secondary system by not stalling write attempts on the remote secondary system during replication to the local bunker system.

Replication module 103 may also replicate the data changes made on the remote secondary system to the local bunker system according to a variety of timetables. For example, replication module 103 may replicate the data changes to the local bunker system until the primary system is ready to receive the data changes. In this example, replication module 103 may cease replication to the local bunker system when: 1) the primary system sends a message to the remote secondary system indicating that the primary system is back online or 2) when the local bunker system starts updating the primary system (an operation that will be described in greater detail below). Additionally or alternatively, replication module 103 may replicate the data changes to the local bunker system until the local bunker system is finished or almost finished updating the primary system. As will be explained in greater detail below, once the local bunker system has finished updating the primary system with the data changes available to the local bunker system, the remote secondary system may then finish updating the primary system with any final data changes.

Figure 7:
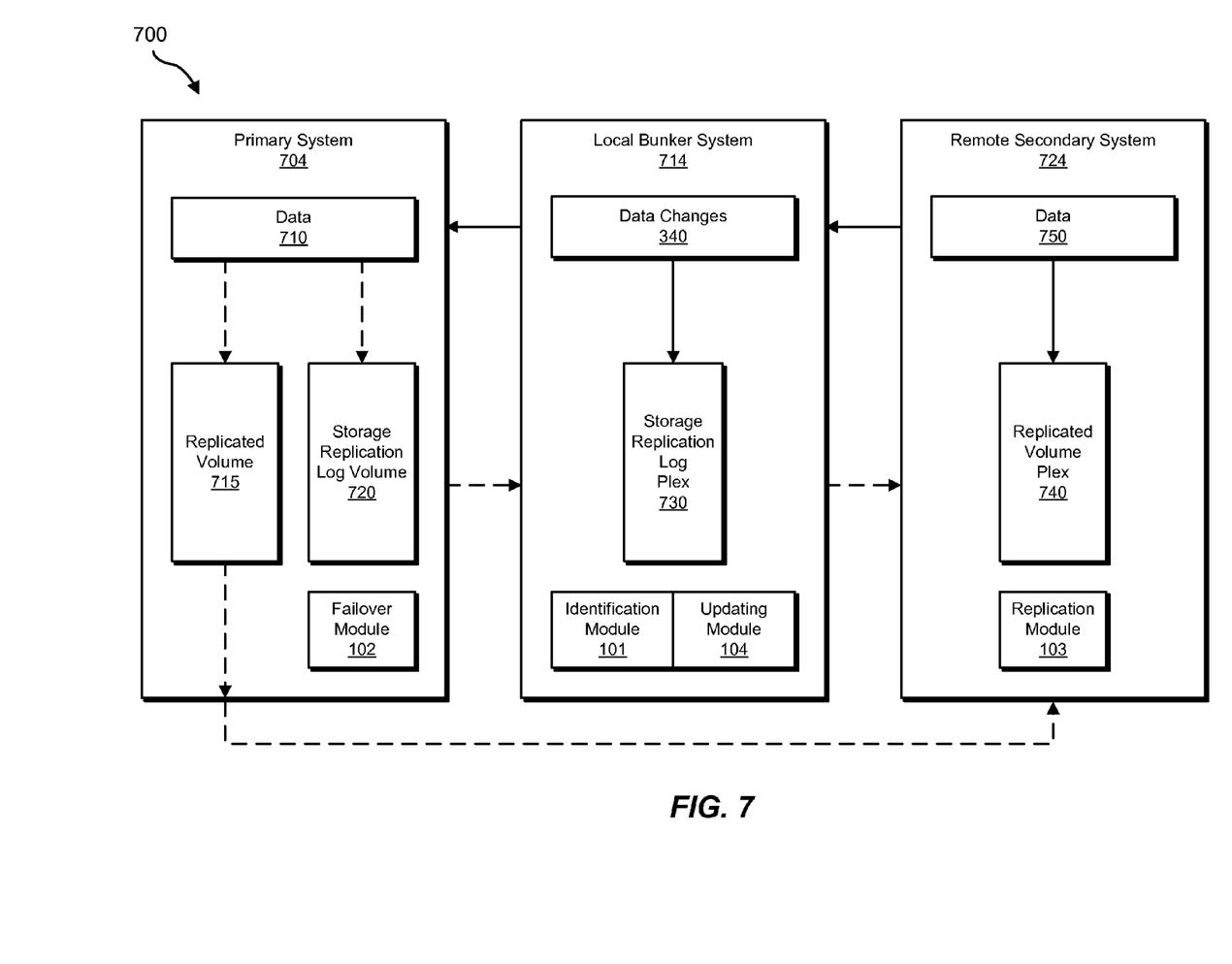
FIG. 7 is a block diagram of an exemplary system for recovering primary sites after failovers to remote secondary sites.

Replication module 103 may also replicate the data changes in any suitable format. For example, replication module 103 may replicate data changes made on the remote secondary system to the local bunker system by storing the data changes in a storage replication log on the local bunker system. As used herein, the phrase "storage replication log" may refer to a volume, file, and/or collection of data that includes data write events as well as an indication of the order in which the data write events were and/or are to be applied. For example, FIG. 7 provides an exemplary illustration of data changes 340 (replicated from remote secondary system 724) stored in a storage replication log plex 730 on local bunker system 714.

In another example, replication module 103 may replicate the data changes made on the remote secondary system to the local bunker system by storing changed regions of data on the local bunker system. For example, replication module 103 may replicate any regions of data changed in replicated volume plex 440 from the time that primary system 404 failed over to remote secondary system 424. In some embodiments, replication module 103 may store only the most recent version of data for each region. For example, if the same region of data undergoes more than one change, replication module 103 may overwrite any previous version of the data region stored on the local bunker system with the latest version of the region. Additionally or alternatively, the remote secondary system may replicate as many regions of changed data to the local bunker system as the local bunker system can store, and cease to replicate new regions of changed data once the local bunker system cannot store any more. As used herein, the phrase "region of data" may refer to a region, sector, unit, collection, and/or group of data.

In certain embodiments, replication module 103 may allocate space on the local bunker system for the data changes in order to store the data changes on the local bunker system. Additionally or alternatively, replication module 103 may use the same space on the local bunker system that was used for replication from the primary site.

Returning to FIG. 5, at step 508 one or more of the systems described herein may update the primary system with the data changes stored on the local bunker system. For example, updating module 104 may, as part of local bunker system 414 in FIG. 4, update primary system 404 with data changes 340 stored on local bunker system 414.

Updating module 104 may update the primary system in a variety of ways. In one example, updating module 104 may update the primary system by: 1) resyncing the primary system with the data changes stored on the local bunker system, 2) terminating replication from the remote secondary system to the local bunker system, and then 3) syncing the primary system with changes made on the remote secondary system that were not replicated to the local bunker system. In this manner, updating module 104 may rely on the local bunker system for efficient transmission of the majority of data to the primary system while updating the primary system with any last changes made by the remote secondary system before the remote secondary system passes operation back over to the primary system.

In an additional example, updating module 104 may update the primary system by: 1) initiating copying of the data changes from the local bunker system to the primary system, 2) receiving a request to read data on the primary system from a changed region that has not yet been updated, 3) retrieving the changed region from the local bunker system, and then 4) fulfilling the request to read data. In this manner, primary system 404 may allow access to application data before the restoration is complete, potentially allowing the primary system to start up sooner than would otherwise be possible.

In another example, updating module 104 may update the primary system by: 1) restoring the primary system from a snapshot and then 2) resyncing the primary system with the data changes stored on the local bunker system. A "snapshot" may refer to any point-in-time replication of a data volume or other data collection. Updating module 104 may restore the primary system from a snapshot in a variety of contexts. For example, a snapshot of replicated volume 415 from before the failover may be stored on local bunker system 414. Updating module 104 may then copy the snapshot from local bunker system 414 to primary system 404. Additionally or alternatively, the snapshot may be stored on primary system 404, in which case updating module 104 may simply recover primary system 404 directly from the snapshot.

After restoring the primary system from the snapshot, updating module 104 may resync the primary system with the data changes stored on the local bunker system in any suitable manner. For example, if the data changes are stored in a storage replication log on local bunker system 414, updating module 104 may perform the write events in the storage replication log in the appropriate order on primary system 404. If, in another example, the data changes are stored as changed regions of data, updating module 104 may overwrite the corresponding regions of data on the primary system with the changed regions of data stored on the local bunker system.

Figure 6:
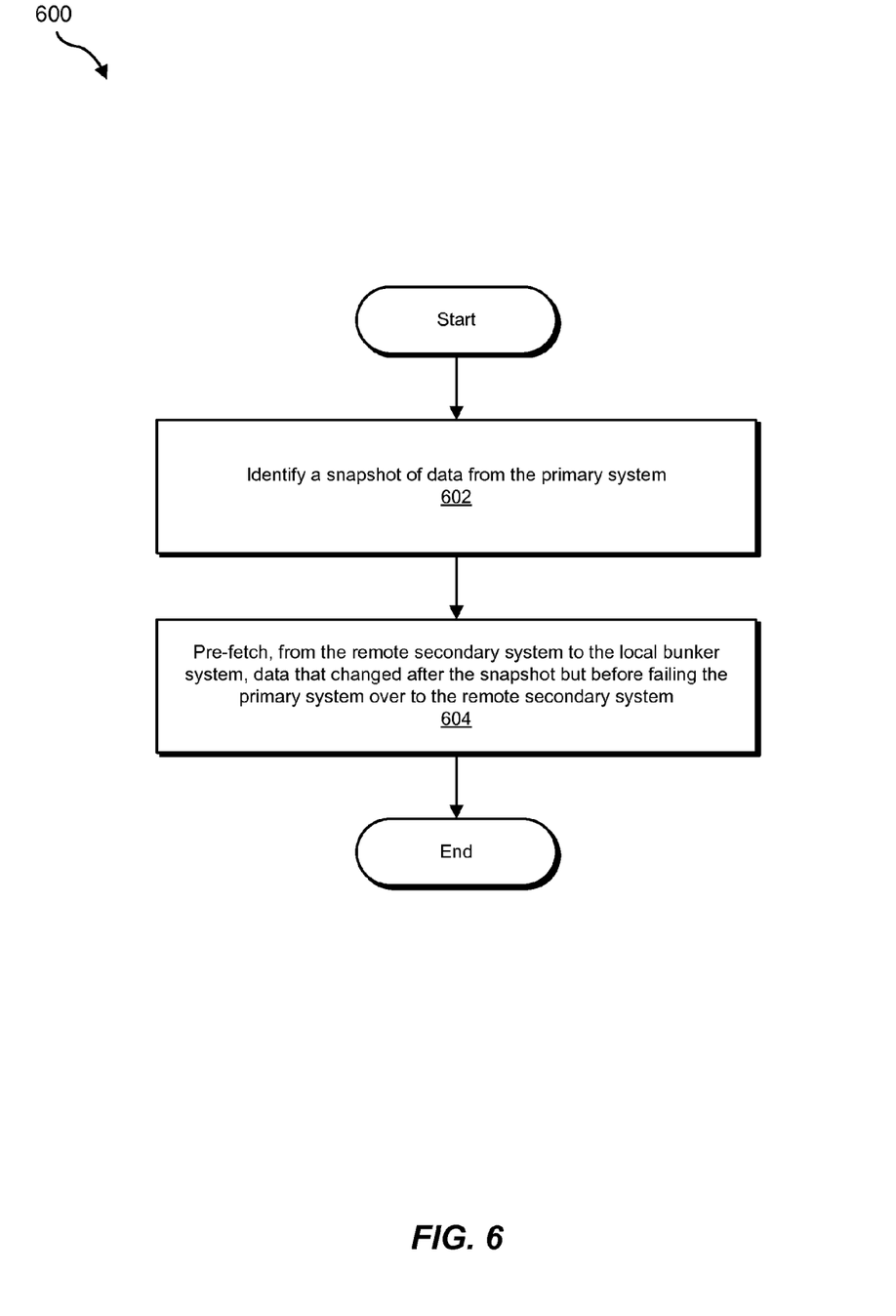
FIG. 6 is a flow diagram of an exemplary method for recovering primary sites after failovers to remote secondary sites.

FIG. 6 is a flow diagram of an exemplary computer-implemented method 600 for recovering primary sites after failovers to remote secondary sites. The steps shown in FIG. 6 may be performed by any suitable computer-executable code and/or computing system. In some embodiments, the steps shown in FIG. 6 may be performed by one or more of the components of system 300 in FIG. 3 and/or system 400 in FIG. 4.

As illustrated in FIG. 6, at step 602 one or more of the systems described herein may identify a snapshot of data from the primary system. For example, identification module 101 may, as part of local bunker system 414, identify a snapshot of data from primary system 404.

Identification module 101 may identify the snapshot of data from the primary system in any suitable manner. For example, identification module 101 may identify the snapshot of data by reading from a configuration file. Additionally or alternatively, identification module 101 may identify the snapshot of data by seeking a predetermined location on a volume that stores the snapshot of data.

At step 604, one or more of the systems described herein may pre-fetch, from the remote secondary system to the local bunker system, data that changed after the snapshot but before failing the primary system over to the remote secondary system. For example, replication module 103 may, as part of remote secondary system 424 in FIG. 4, pre-fetch (to local bunker system 414) data that changed after the snapshot but before failing the primary system over to the remote secondary system.

Replication module 103 may pre-fetch the data that changed after the snapshot but before failing the primary system over to the remote secondary system in a variety of ways. For example, replication module 103 may: 1) identify a data change object from the primary system on the local bunker system and then 2) identify, based on the data change object, data that changed after the snapshot but before failing the primary system over to the remote secondary system. As used herein, "data change object" may refer to any mechanism and/or data component that enables and/or facilitates re-synchronization of a volume. For example, a "data change object" may include a data structure that indicates which regions of data of a data volume have changed (e.g., over a certain period of time).

Figure 8:
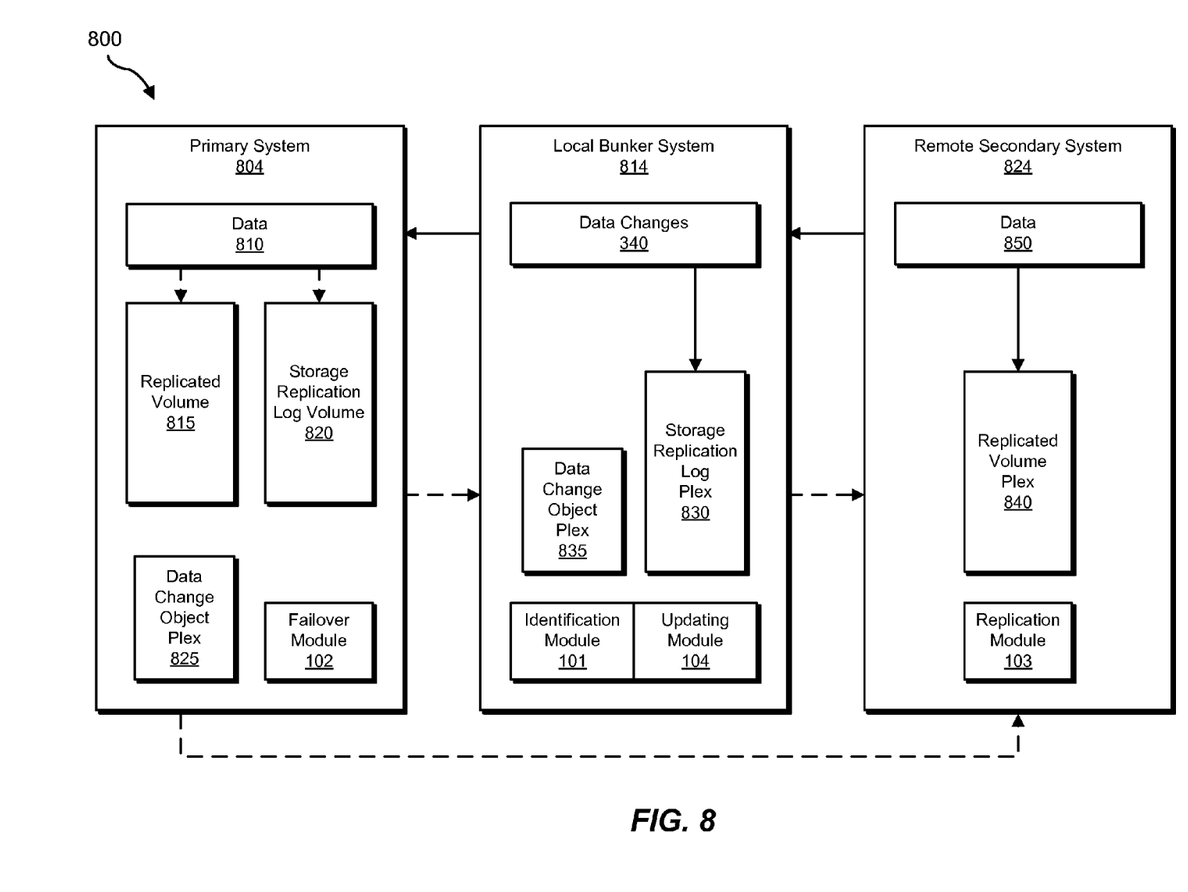
FIG. 8 is a block diagram of an exemplary system for recovering primary sites after failovers to remote secondary sites.

For example, as FIG. 8 illustrates, the primary system may have maintained a data change object (such as data change object plex 825 on primary system 804) and mirrored the data change object to the local bunker system (e.g., data change object plex 835 on local bunker system 814). In this example, the data change object may store information regarding data changes made on the primary system after the snapshot. By restoring the snapshot and pre-fetched data changes, the primary system may be ready for updates of data changes that were subsequently made on the remote secondary system.

According to some embodiments, if a volume on the remote secondary system returns the latest valid checkpoint image of data rather than the latest data, replication module 103 may also sync regions updated between the last volume snapshot and the last valid checkpoint image from the remote secondary system.

In another example, replication module 103 may pre-fetch the data that changed after the snapshot but before failing the primary system over to the remote secondary system by: 1) saving, in a storage replication log on the local bunker system, data that is changed after the snapshot and then 2) pre-fetching, from the remote secondary system to the local bunker system, data that is not in the storage replication log that changed after the snapshot but before failing the primary system over to the remote secondary system.

Replication module 103 may save the data changed after the snapshot in the storage replication log on the local bunker system by mirroring a storage replication log stored on the primary system. For example, as illustrated in FIG. 8, a primary system 804 may include a storage replication log 820 that stores write events from data (such as a data 810) written to a data volume (such as a replicated volume 815). In this example, replication module 103 may mirror storage replication log 820 onto a local bunker system 814 (e.g., storage replication log plex 830).

Replication module 103 may pre-fetch data that is not in the storage replication log that changed after the snapshot but before failing the primary system over to the remote secondary system in any suitable manner. For example, replication module 103 may: 1) generate a bitmap for regions of data not in the storage replication log but reflected as changed in a data change object and then 2) copy the regions indicated by the bitmap from the remote secondary system to the local bunker system. For example, as illustrated in FIG. 8, replication module 103 may generate a bitmap for regions of data not covered by storage replication log plex 830 but indicated by data change object plex 835. Replication module 103 may then retrieve the regions indicated by the bitmap from a replicated volume plex 840 on a remote secondary system 824.

As detailed above, by keeping a local bunker system up-to-date with changes made to application data on a remote secondary system, the systems and methods described herein may restore a primary system using data on the local bunker system, as opposed to having to restore the primary site directly from the remote secondary system. As such, these systems and methods may avoid the delays that typically result from having to restore a primary site directly from a remote secondary system, potentially resulting in a faster and more efficient recovery of the primary system While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

In one example, one or more of the various systems described herein may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules described herein may transform a local bunker system into a system for efficient restoration of a primary system after a failover.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for recovering primary sites after failovers to remote secondary sites, at least a portion of the method being performed by a computing device comprising at least one processor, the method comprising:

identifying a primary system configured to replicate data to both a local bunker system and a remote secondary system, wherein the local bunker system is local to the primary system and the remote secondary system is remote to both the primary system and the local bunker system;

failing the primary system over to the remote secondary system by causing the remote secondary system to perform at least one computing task in place of the primary system;

while the remote secondary system is performing the computing task in place of the primary system and before restoring data to the primary system, continuously replicating data changes made on the remote secondary system to the local bunker system until the primary system is ready to receive the data changes;

after the primary system is ready to receive data changes:
partially updating, from the local bunker system, the primary system with data changes replicated to the local bunker system;
partially updating, from the remote secondary system, the primary system with data changes made on the remote secondary system not used to update the primary system from the local bunker system.

2. The computer-implemented method of claim 1, further comprising terminating replication from the remote secondary system to the local bunker system, wherein the data changes made on the remote secondary system not used to update the primary system from the local bunker system comprise data changes that are made on the remote secondary system after terminating replication from the remote secondary system to the local bunker system.

3. The computer-implemented method of claim 1, wherein the data changes made on the remote secondary system not used to update the primary system from the local bunker system comprise data changes that are made on the remote secondary system after the primary system is ready to receive the data changes replicated to the local bunker system.

4. The computer-implemented method of claim 1, wherein the data changes made on the remote secondary system not used to update the primary system from the local bunker system comprise data changes that are made on the remote secondary system after the primary system is back online.

5. The computer-implemented method of claim 1, wherein the data changes made on the remote secondary system not used to update the primary system from the local bunker system comprise data changes that are made on the remote secondary system after the local bunker system starts updating the primary system with the data changes replicated to the local bunker system.

6. The computer-implemented method of claim 1, wherein the data changes made on the remote secondary system not used to update the primary system from the local bunker system comprise data changes that are made on the remote secondary system after the local bunker system finishes updating the primary system with the data changes replicated to the local bunker system.

7. The computer-implemented method of claim 1, further comprising:
identifying a snapshot of data from the primary system;
pre-fetching, from the remote secondary system to the local bunker system, data that changed after the snapshot but before failing the primary system over to the remote secondary system.

8. The computer-implemented method of claim 7, wherein pre-fetching the data that changed after the snapshot comprises:

identifying a data change object from the primary system on the local bunker system;

identifying, based on the data change object, data that changed after the snapshot but before failing the primary system over to the remote secondary system;

sending a request, from the local bunker system to the remote secondary system, for the data that changed after the snapshot but before failing the primary system over to the remote secondary system.

9. The computer-implemented method of claim 7, wherein pre-fetching the data that changed after the snapshot comprises:

saving, in a storage replication log on the local bunker system, data that changed after the snapshot;

pre-fetching, from the remote secondary system to the local bunker system, data that is not in the storage replication log that changed after the snapshot but before failing the primary system over to the remote secondary system.

10. The computer-implemented method of claim 7, wherein partially updating the primary system with the data changes replicated to the local bunker system comprises:

restoring, after pre-fetching the data that changed after the snapshot, the primary system from the snapshot of data from the primary system and the data that changed after the snapshot pre-fetched to the local bunker system;

resyncing, after restoring the primary system, the primary system with the data changes replicated to the local bunker system.

11. The computer-implemented method of claim 1, wherein partially updating the primary system with the data changes replicated to the local bunker system comprises:

restoring the primary system from a snapshot;

resyncing the primary system with the data changes replicated to the local bunker system.

12. The computer-implemented method of claim 1, wherein partially updating the primary system with the data changes replicated to the local bunker system comprises:

initiating copying of the data changes replicated to the local bunker system from the local bunker system to the primary system;

receiving a request to read data on the primary system from a changed region that has not yet been updated;

retrieving the changed region from the local bunker system;

fulfilling the request to read data.

13. A system for recovering primary sites after failovers to remote secondary sites, the system comprising:

an identification module programmed to identify a primary system configured to replicate data to both a local bunker system and a remote secondary system, wherein the local bunker system is local to the primary system and the remote secondary system is remote to both the primary system and the local bunker system;

a failover module programmed to fail the primary system over to the remote secondary system by causing the remote secondary system to perform at least one computing task in place of the primary system;

a replication module programmed to continuously replicate, while the remote secondary system is performing the computing task in place of the primary system and before restoring data to the primary system, data changes made on the remote secondary system to the local bunker system until the primary system is ready to receive data changes;

an updating module programmed to:

partially update, from the local bunker system, the primary system with data changes replicated to the local bunker system after the primary system is ready to receive data changes;

partially update, from the remote secondary system, the primary system with data changes made on the remote secondary system not used to update the primary system from the local bunker system;

at least one processor configured to execute the identification module, the failover module, the replication module, and the updating module.

14. The system of claim 13, wherein:

the replication module is further programmed to terminate replication from the remote secondary system to the local bunker system;

the data changes made on the remote secondary system not used to update the primary system from the local bunker system comprise data changes that are made on the remote secondary system after terminating replication from the remote secondary system to the local bunker system.

15. The system of claim 13, wherein the data changes made on the remote secondary system not used to update the primary system from the local bunker system comprise data changes that are made on the remote secondary system after the primary system is ready to receive the data changes replicated to the local bunker system.

16. The system of claim 13, wherein the data changes made on the remote secondary system not used to update the primary system from the local bunker system comprise data changes that are made on the remote secondary system after the primary system is back online.

17. The system of claim 13, wherein the data changes made on the remote secondary system not used to update the primary system from the local bunker system comprise data changes that are made on the remote secondary system after the local bunker system starts updating the primary system with the data changes replicated to the local bunker system.

18. The system of claim 13, further comprising a pre-fetching module programmed to:

identify a snapshot of data from the primary system;

pre-fetch, from the remote secondary system to the local bunker system, data that changed after the snapshot but before failing the primary system over to the remote secondary system.

19. A non-transitory computer-readable-storage medium comprising one or more computer-executable instructions that, when executed by at least one processor of a computing device, cause the computing device to:

identify a primary system configured to replicate data to both a local bunker system and a remote secondary system, wherein the local bunker system is local to the primary system and the remote secondary system is remote to both the primary system and the local bunker system;

fail the primary system over to the remote secondary system by causing the remote secondary system to perform at least one computing task in place of the primary system;

while the remote secondary system is performing the computing task in place of the primary system and before restoring data to the primary system, continuously replicate data changes made on the remote secondary system to the local bunker system until the primary system is ready to receive data changes;

after the primary system is ready to receive data changes:

partially update, from the local bunker system, the primary system with data changes replicated to the local bunker system;

partially update, from the remote secondary system, the primary system with data changes made on the remote secondary system not used to update the primary system from the local bunker system.

\* \* \* \* \*